United States Patent [19]

Nystuen et al.

[11] Patent Number: 4,802,545

[45] Date of Patent: * Feb. 7, 1989

[54] STEERING CONTROL SYSTEM FOR ARTICULATED VEHICLE

[75] Inventors: Paul A. Nystuen; Barry D. Batcheller, both of West Fargo; Kevin L. Brekkestran, Fargo; Calvin J. Kraning, Valley City, all of N. Dak.

[73] Assignee: J. I. Case Company, Racine, Wis.

[*] Notice: The portion of the term of this patent subsequent to Sep. 20, 2005 has been disclaimed.

[21] Appl. No.: 109,661

[22] Filed: Oct. 15, 1987

Related U.S. Application Data

[63] Continuation-in-part of Ser. No. 919,172, Oct. 15, 1986, Pat. No. 4,771,851.

[51] Int. Cl.⁴ .................... B62D 5/06; B62D 12/00
[52] U.S. Cl. ................................. 180/135; 180/136; 180/142; 280/459
[58] Field of Search ............ 180/134, 135, 136, 138, 180/139, 140, 144, 149, 79.4, 235, 237, 238; 280/459

[56] References Cited

U.S. PATENT DOCUMENTS

| | | |
|---|---|---|
| 2,494,324 | 4/1944 | Wright . |
| 2,863,234 | 9/1954 | Armington . |
| 2,936,038 | 5/1960 | Rockwell et al. . |
| 3,380,547 | 12/1964 | Granryd . |
| 3,515,235 | 6/1970 | Kamner . |
| 3,527,315 | 5/1970 | Hampton . |
| 3,529,690 | 9/1970 | Mathew . |
| 3,532,178 | 9/1968 | Lindbom . |
| 3,556,243 | 4/1969 | Susag et al. . |
| 3,750,834 | 8/1973 | Luft . |
| 3,771,241 | 11/1973 | Lindell et al. . |
| 3,800,903 | 4/1974 | Beals et al. . |
| 3,834,480 | 9/1974 | McGee ........................ 180/135 |
| 3,856,102 | 12/1974 | Queen . |
| 3,952,825 | 4/1976 | Beyers . |
| 3,991,847 | 11/1976 | Unruh . |
| 4,042,053 | 8/1977 | Sieren et al. . |
| 4,109,748 | 8/1978 | Evans . |
| 4,117,905 | 10/1978 | Mustered . |
| 4,175,638 | 11/1979 | Christensen . |
| 4,199,038 | 4/1980 | Rathje et al. ................ 180/140 |
| 4,315,555 | 2/1982 | Schritt . |
| 4,351,408 | 9/1982 | Moll ............................ 180/135 |
| 4,365,685 | 12/1982 | Ratsko et al. ............... 180/135 |
| 4,373,603 | 2/1983 | Nelson . |
| 4,565,257 | 1/1986 | Hanson . |
| 4,693,331 | 9/1987 | Johnson ....................... 180/135 |

FOREIGN PATENT DOCUMENTS

650730 10/1962 Canada .

Primary Examiner—David M. Mitchell
Assistant Examiner—Charles R. Watts
Attorney, Agent, or Firm—Cullen, Sloman, Cantor, Grauer, Scott & Rutherford

[57] ABSTRACT

A steering system for an articulated vehicle has pivotal wheel steering such as front axle wagon-wheel steering, a hydraulic actuator for pivoting the axle with respect to the vehicle, and a pair of hydraulic actuators for causing articulation of the vehicle. The system includes sensors for providing signals dependent on the degree of front wheel pivot relative to the vehicle and the degree of articulation of the vehicle. These signals are detected by a microprocessor controller which in turn controls the sequence of actuation of the axle and articulation hydraulic actuators. The actuators are operated sequentially so that small directional changes of the vehicles are achieved solely through pivoting of the axle. Operation of the axle and articulation actuators is controlled by a manual steering unit having a conventional hydraulic steering valve, with sequencing being provided through manipulation of a hydraulic fluid diverter valve. The timing and duration of the diverter valve actuation is controlled by the controller as a function of various dynamic turning parameters of the vehicle and the response time of the valve. A make-up valve system is also preferably included for automatically returning the articulation cylinders to their home position under certain conditions as the vehicle operates in a pivotable wheel steering mode.

12 Claims, 8 Drawing Sheets

STEERING CONTROL SYSTEM FOR ARTICULATED VEHICLE

CROSS-REFERENCE TO RELATED APPLICATION

This application is a continuation-in-part of co-pending U.S. patent application Ser. No. 919,172 filed Oct. 15, 1986 now U.S. Pat. No. 4,771,851, issued Sept. 20, 1988.

BACKGROUND OF THE INVENTION

1. Field of the Invention

This invention relates to steering systems for articulated vehicles and particularly to a steering system for effectively combining vehicle articulation steering with pivotable wheel steering such as may be accomplished by wagon-wheel movement of one axle of the vehicle.

2. Description of the Prior Art

It has become common to articulate certain off-road vehicle such as tractor, graders, scrapers, etc. An articulated vehicle has a smaller turning radius than might otherwise be possible and is more versatile in rough terrain, especially if the vehicle includes a four-wheel drive feature. In such vehicles, articulation is typically achieved by means of a pair of hydraulic cylinders mounted between two articulating body portions of the vehicle. For turning in one direction, one cylinder is extended while the other is retracted, and for turning in the other direction, the opposite reactions occur. In such systems, steering is controlled by means of a mechanical steering control unit which is tied to the vehicle wheel and includes a valve for controlling the flow of pressurized hydraulic fluid to and from the articulation cylinders.

In order to obtain even tighter turning radii and other steering benefits for articulated vehicles, articulation has been combined with other conventional pivotable wheel steering schemes. For example, U.S. Pat. No. 3,515,235, granted June 2, 1970 to Kamner, discloses a combination articulated and Ackerman steering system for vehicles. Similarly, U.S. Pat. No. 3,991,847, granted Nov. 16, 1976 to Unruh, shows an articulated vehicle having one axle mounted in a wagon-steer mode in addition to the conventional articulated-steer mode. The control and feedback for prior art systems of this type has been dependent upon mechanical or hydraulic linkages, which are susceptible to gradual fading and locational errors due to fluid leakage and mechanical restraints. One prior art system which at least partially overcomes these problems is found in U.S. Pat. No. 4,565,257, granted Jan. 21, 1986 to Hanson, which discloses a combination articulated and front-wheel Ackerman steering systems. In the combined steering mode of this steering system, a conventional hydraulic steering unit controls the front wheels, and two potentiometers are used to monitor the degree of front-wheel pivot and the degree of articulation, so that an electrical steering control network can operate the independent hydraulic actuator used for articulated steering in a slave-follower relationship with respect to the orientation of the front wheels. This combined steering mode produces enhanced maneuverability for the vehicle since the steering effect of the front wheels is effectively amplified by the substantially simultaneous, proportional movement of the articulated steering system.

While attempts have been made to combine various steering schemes on an articulated vehicle, an effective control system for such combined steering arrangements which utilizes a conventional mechanically-operated steering control unit with variable hydraulic output for smoothly operating both the articulated steering hydraulic actuator means and the pivotable wheel steering hydraulic actuator means has not been achieved in the prior art. Also, no steering system for an articulated vehicle is known which has an effective scheme for efficiently monitoring the various positions and rates of change of the steering elements with respect to one another and controlling further the timing of changes of steering modes of the vehicle in response thereto automatically, so as to provide a vehicle with smooth automatic transitions between the pivotable steering wheel mode and the articulated steering mode. Accordingly, an important object of the present invention is to provide a steering system for an articulated vehicle which overcomes the aforementioned problems and provides the aforementioned capabilities not heretofore achieved in earlier steering systems.

SUMMARY OF THE INVENTION

In light of the foregoing problems and object, there is provided according to one aspect of the present invention, an improved steering system for an articulated vehicle of the type having first and second frame portions, each provided with at least one pair of ground-engaging wheels. The wheels associated with the first frame portion are mounted for pivotable wheel steering through pivoting movement of such wheels with respect to the first frame portion. The articulated vehicle further has first hydraulic actuator means for pivoting the wheels of the first frame portion with respect to the first frame portion, and second hydraulic actuator means for articulated steering by articulating the first and second frame portions relative to one another. The improvement to the steering system of the foregoing type comprises: first means for determining the degree of pivot of at least one wheel of the first frame portion relative to the first frame portion; second means for determining the degree of articulation of the first and second frame portions; steering control means for selecting the direction of vehicle travel; and system control means for controlling the first and second hydraulic actuators. The steering control means includes a manual steering member, at least first and second hydraulic fluid conduits, and hydraulic valve means for directing pressurized hydraulic fluid to the first conduit when movement of the manual steering member by a vehicle operator indicates the vehicle is to turn toward a first direction and to the second conduit when movement of the manual steering member by the vehicle operator indicates the vehicle is to turn in a second opposite direction. The system control means controls the first and second hydraulic actuators in response to the degree of pivot, the degree of articulation, and the pressurized hydraulic fluid in the first and second conduits. The system control means includes electrically-operated hydraulic control valve means, in fluid communication with the first and second conduits and the first and second hydraulic actuator means, for diverting the flow of pressurized hydraulic fluid in the first and second conduits sequentially between the first and second hydraulic actuators to effect steering of the vehicle by pivotable wheel steering and articulation steering. In this steering control system, the system control means preferably operates the electrically-operated hydraulic control valve means so that sufficiently small operator-selected directional changes from straight-ahead vehicle travel are accomplished by the pressurized fluid being diverted by the electrically-operated valve means solely to the first hydraulic actuator means. Also, larger operator-selected directional changes from a straight-ahead vehicle travel which require the wheels of the first frame portion to exceed a predetermined range of pivot with respect to the first frame portion are accomplished by the pressurized fluid being diverted by the electrically-operated valve means initially to the first hydraulic actuator means until such predetermined range of pivot will be reached, and thereafter to the second hydraulic actuator means.

According to a second aspect of the invention, there is provided an improved steering control system for an articulated vehicle of the type having an articulation steering mode and a pivotable wheel steering mode. In the articulation steering mode, the first and second frame portions of the vehicle are articulated by first hydraulic actuator means to steer the vehicle. In the pivotable wheel steering mode, at least one pair of wheels mounted on the first frame portion is pivoted relative thereto by second hydraulic actuator means to steer the vehicle. In this steering control system, the improvement comprises: steering control means for enabling a vehicle operator to select the direction of travel, including a manual steering member; first hydraulic valve means for switching from one steering mode to the other steering mode and vice-versa by selectively directing pressurized hydraulic fluid to the first and second hydraulic actusator means; and electrically-operated make-up valve means, distinct from the first hydraulic valve means, for controlling hydraulic fluid flow between a fluid source and the first hydraulic actuator means to bring the first and second frame portions to a predetermined articulation position when a correction of the articulation position of the first and second frame portions is desired while the steering control system is operating in the pivotable wheel steering mode. In this steering system, the predetermined articulation position is normally a home articulation position where the longitudinal axes of the first and second frame portions are substantially colinearly aligned. The electrically-operated make-up valve means preferably includes at least a pair of solenoids associated with at least one hydraulic control valve. The electrical energization of the first such solenoid causes movement of the first hydraulic actuator means in a first direction, and the electrical energization of the second solenoid causes movement of the first hydraulic actuator means in a second opposite direction.

These and other aspects, objects, features and advantages of the present invention will become readily apparent from the following detailed description, accompanying drawings and the appended claims.

DETAILED DESCRIPTION OF THE PREFERRED EMBODIMENTS

Mechanical and Basic Hydraulic Components

Figure 1:
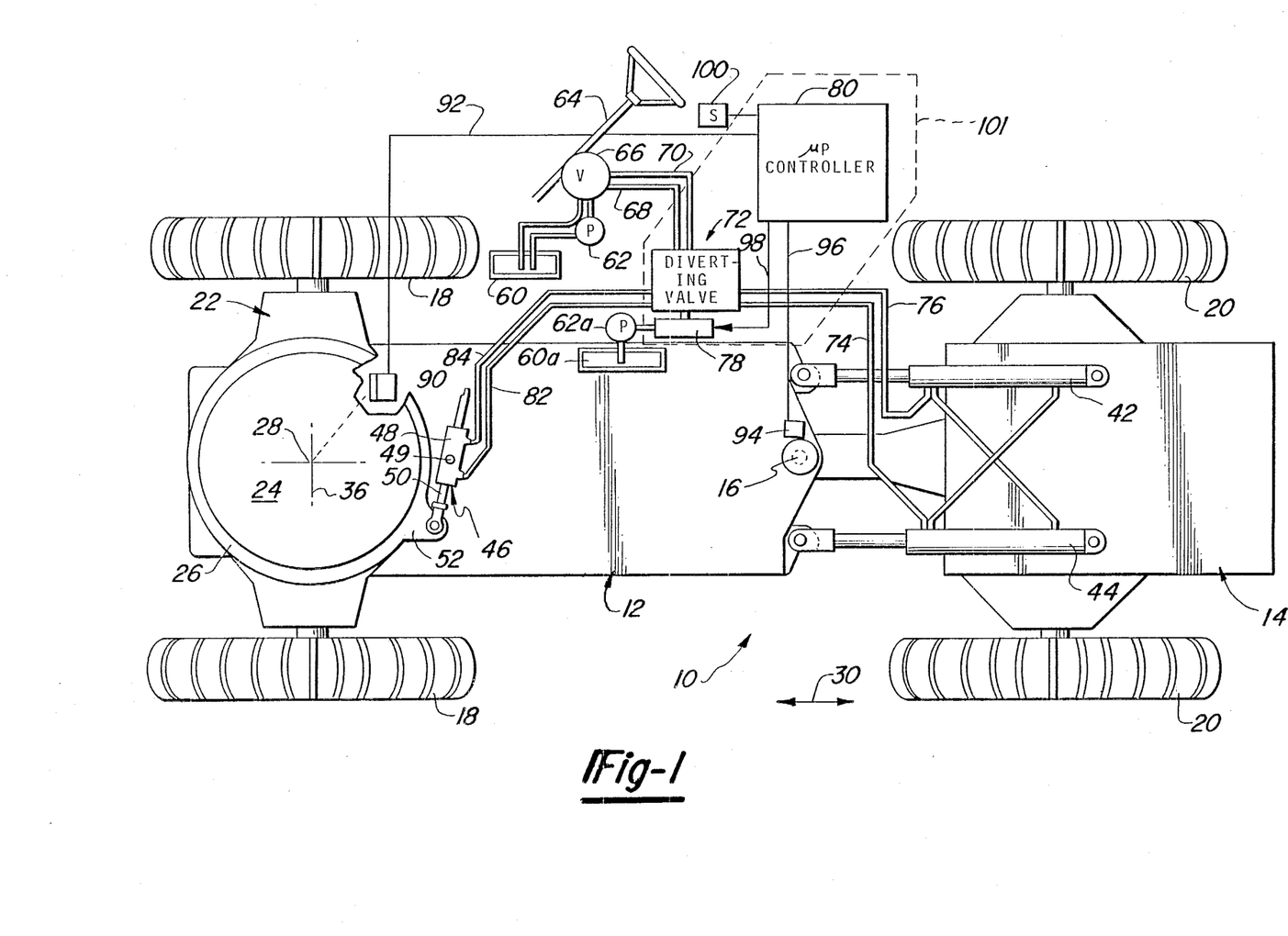
FIG. 1 is a diagrammatic top plan view of an articulated vehicle employing the improved steering system of the present invention.

In FIG. 1, an articulated vehicle 10 is seen which, as typical, has articulable frame portions 12 and 14. Articulated vehicle 10 in the preferred embodiments of the present invention is an off-road vehicle, namely an agricultural four-wheel drive tractor to which a trailing ground-engaging implement (not shown) may be attached. Vehicle 10 shown in FIG. 1 is also representative of other articulated off-road vehicles used in the agricultural and construction equipment industries such as graders, scrapers, etc. The frame portions 12 and 14 are pivotally connected to articulate about a vertical axis defined by an articulation pivot point 16. Frame portion 12 has an axle with forward wheels 18 mounted thereon, and frame portion 14 has an axle with rearward wheels 20 mounted thereon for supporting the vehicle 10. In a preferred embodiment, the vehicle is a four-wheel drive vehicle with power supplied to each wheel from the vehicle's engine or engines (not shown). The frame portions 12 and 14 are pivotally connected in a conventional manner so that in addition to pivoting about a vertical axis at articulation pivot point 16, side-to-side oscillation movement of the frame portions relative to one another is permitted. This allows the vehicle 10 to traverse uneven terrain.

The forward wheels 18 are mounted on a wagon-wheel axle 22, which in turn is pivotally mounted with respect to frame portion 12. Frame portion 12 has an inner circular pivot guide 24, about which is mounted a pivot ring 26 of the wagon-wheel axle 22. The center of circular pivot guide 24 is thus an axle pivot point 28 defining a vertical axis about which the wagon-wheel axle 22 pivots with respect to its frame portion 12.

Figure 2A:
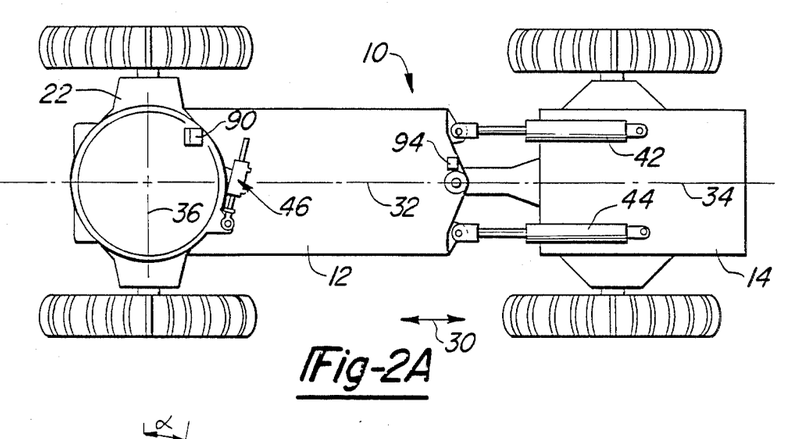
FIG. 2A is a diagrammatic top plan view of the articulated vehicle with the longitudinal axes of the articulable frame portions colinearly aligned and the wagon-wheel axle aligned perpendicularly with respect to the axis of its frame portion.

When aligned for generally linear vehicle travel as seen in FIGS. 1 and 2A, the vehicle 10 moves longitudinally in the forward or rearward directions indicated by arrow 30. The frame portions 12 and 14 have longitudinal axes 32 and 34, respectively, which are placed in generally colinear alignment for such linear vehicle travel. In addition, the wagon-wheel axle 22 (which defines a lateral axis 36) is aligned generally perpendicularly with respect to the longitudinal axis 32 of the frame portion 12 for such linear vehicle travel, as seen in FIGS. 1 and 2A. In this mode of vehicle travel, the articulation pivot point 16 and axle pivot point 28 are also generally aligned along the colinear longitudinal axes of the frame portions 12 and 14.

Articulated steering of the vehicle is accomplished by a pair of double-acting hydraulic actuators 42 and 44 connected between the frame portions 12 and 14 in a typical manner, with each of the actuators being pivotally mounted to the frame portions on separate sides of the articulation pivot point 16. These articulated steering actuators are cross-connected across the articulation pivot point 16 in such a manner that steering is effected by extending one actuator while simultaneously retracting the other to force articulation movement between the frame portion 12 and frame portion 14 about the articulation pivot point 16.

Wagon-wheel axle steering is accomplished by a single double-acting hydraulic actuator 46 connected between the frame portion 12 and axle 22. As seen in FIG. 1, the cylinder portion 48 of the axle actuator 46 is pivotally mounted on a general vertical axis at the location 49 to the frame portion 12, while one end of the piston rod portion 50 of the actuator 46 is pivotally mounted to an ear 52 on the pivot ring 26 of the wagon-wheel axle 22. Steering of the vehicle 10 via the axle 22 is thus accomplished by either retracting or extending the piston rod portion 50 of the axle actuator 46 with respect to the cylinder portion 48 thereof, which in turn pivots the axle 22 about axle pivot point 28 with respect to the frame portion 12.

The Steering Sequence

Figure 2B:
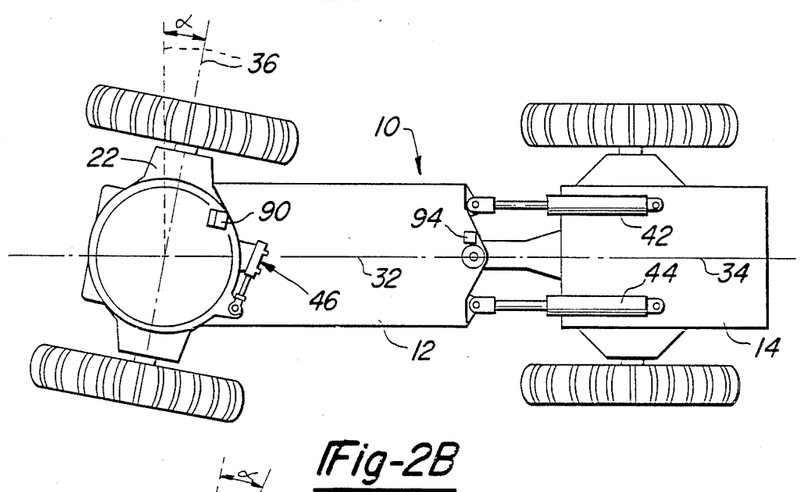
FIG. 2B is a view similar to that of FIG. 2A, except that the pivotable wheels are shown in a turned relationship

As mentioned, FIG. 2A illustrates the vehicle 10 configured for generally linear travel. Small degrees of vehicle turning are preferably accomplished by means of pivoting the axle 22 with respect to the vehicle 10, rather than through articulation. As seen in FIG. 2B, axle 22 is pivotable alpha degrees with respect to its perpendicular position (shown as phantom line 36) relative to the frame portion 12. Of course, the extent of pivoting of the axle 22 with respect to its frame portion 12 is limited to that position at which the tires 18 contact the sides of frame portion 12. In a preferred embodiment, the axle 22 is pivoted a maximum of five degrees to the right or left, thereby defining a pivot range of ten degrees centered about an axle home position wherein the lateral axis 36 of the axle 22 is aligned generally perpendicularly with respect to the longitudinal axis 32 of the frame portion 12. For minor steering adjustments such as those required to keep the vehicle 10 on a straight course as it travels through crop rows, the axle actuator 46 is controlled to move the axle 22 within this pivoting range.

Figure 2C:
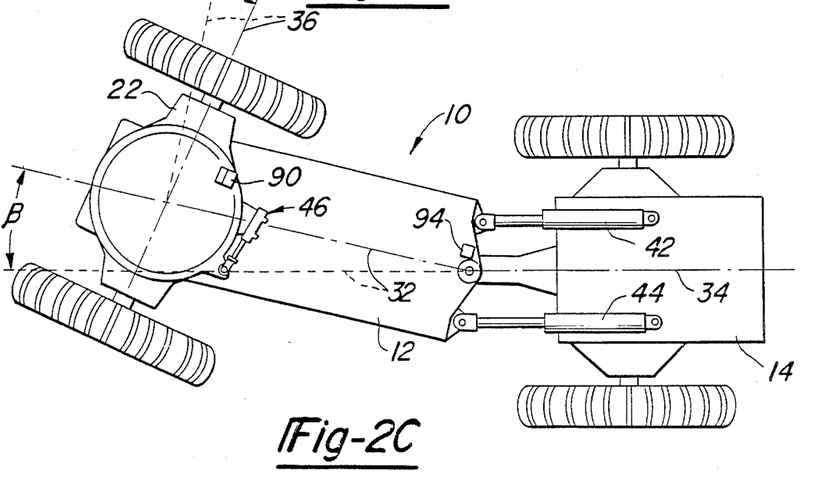
FIG. 2C is a view similar to that of FIG. 2B, except that the frame portions are articulated with respect to one another.

For turning the vehicle 10 in a smaller turning radius, the vehicle 10 is articulated in addition to the pivoting of axle 22. As seen in FIG. 2C, such turning is accomplished first by pivoting the axle 22 (alpha degrees with respect to the frame portion 12) to its maximum extent and then controlling the articulation actuators 42 and 44 to articulate the frame portions 12 and 14 (beta degrees with respect to one another). The extent of articulation is also limited by the physical constraints of the vehicle components, but in a preferred embodiment, the frame portions 12 and 14 are articulable to a maximum of forty degrees to either the right or left from a line defined by the longitudinal axes 32 and 34 of the frame portions 12 and 14 when colinearly aligned.

Turning of the vehicle 10 is accomplished through sequential actuation of the axle cylinder 46 and articulation cylinders 42 and 44. For turning to the right, for example, the axle actuator 46 is first activated to pivot the axle 22 to the maximum extent allowed (preferably 5 degrees) as seen in FIG. 2B. As the axle 22 reaches its maximum extension, the articulation actuators 42 and 44 are then activated to swing frame portion 12 to the right with respect to frame portion 14, as seen in FIG. 2C. The movement of frame portion 12 with respect to frame portion 14 continues to the extent controlled by the vehicle operator or until a maximum articulation position of the frame portions is reached (forty degrees of articulation). To straighten out the travel of the vehicle 10 at the end of a turn, the articulation actuators 42 and 44 are activated in reverse to again bring the frame portions 12 and 14 into generally colinear alignment, and then the axle actuator 46 is activated to position the axle 22 again generally perpendicularly with respect to the frame portion 12. While FIGS. 2B–2C illustrate the vehicle executing a right turn, it should be apparent that a left turn is accomplished in a similar, but reverse, manner.

Figures 3, 4:
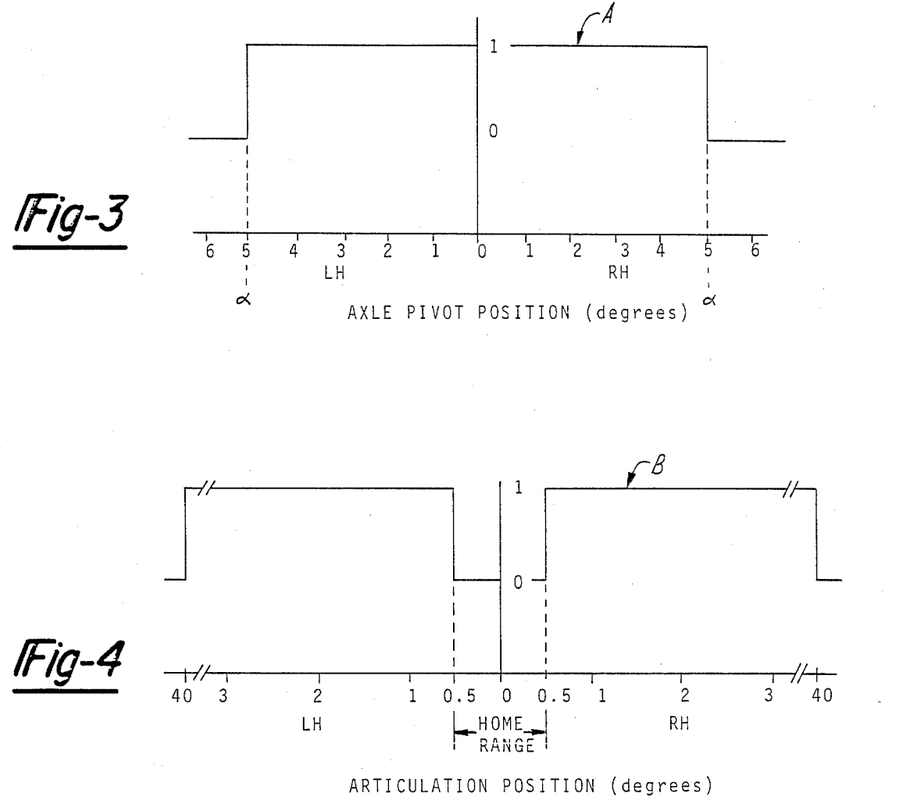
FIG. 3 is a truth table for operation of the wagon-wheel axle steer actuator with respect to the degree of pivot of the axle relative to its frame portion.
FIG. 4 is a truth table for operation of the articulation actuators with respect to the degree of articulation of the frame portions.

FIG. 3 is a "truth table" which illustrates, via line "A," when the axle steering mode is in its activated state (represented by "1" on the y-axis of FIG. 3) and its unactivated state (represented by "0" of the y-axis of FIG. 3). The x-axis in FIG. 3 illustrates the wagon-wheel axle pivot position (in degrees) relative to its frame portion. FIG. 3 shows that for pivoting the wagon-wheel axle with respect to its frame portion from zero to five degrees (either to the left or right from a position where the lateral axis of the axle is perpendicular to the longitudinal axis of its frame portion), the axle actuator is activated (state "1" in FIG. 3). Once five degrees of axle pivot with respect to the vehicle 10 is reached, however, the axle actuator is deactivated (state "0" in FIG. 3) so that the axle turns no farther.

FIG. 4 is a "truth table" which illustrates via line "B," when the articulation steering mode is in its activated state (represented by "1" on the y-axis of FIG. 4) and its unactivated state (represented by "0" on the y-axis in FIG. 4). The x-axis in FIG. 3 illustrates the articulation position (in degrees) of the two frame portions relative to one another. As seen, there is a central small range (a "home range") in which the articulation actuators are not activated. This "home range" extends one-half degree on either side of the line representing the colinearly aligned relationship of the frame portions as seen in FIG. 2A. Thus, on returning from an articulated position to a colinearly aligned position, the frame portions do not have to be absolutely colinear for the articulation cylinders to be deactivated. Simply placing the frame portions within one-half degree of being colinearly aligned is deemed sufficient for further vehicle operation. Thus, when articulation is being returned to center (a position for linear vehicle travel), once the frame portions are within one-half degree of being colinearly aligned, the articulation cylinders are deactivated. The articulation actuators are also deactivated when the outer articulation position of 40 degrees is reached to either side of center.

The steerable wagon-wheel axle provides sufficient small-turn steering control to allow maneuvering along and through generally parallel crop rows in an accurate manner, thus avoiding the traditional "tail wag" of an articulated four-wheel drive tractor. Steering requirements beyond small-turn steering (five degrees) are accomplished by switching to articulated steering in a smooth manner, thereby allowing the tight turns enjoyed by an articulated tractor. To make a turn, only the wagon-wheel axle steers until it has reached its maximum pivot, then the hydraulic power is switched to the articulation steering system for completing the desired amount of turn. When returning to a linear travel mode, articulation is returned to center before the hydraulic power is switched back to the wagon-wheel axle for steering, which then completes the return of the vehicle turning to center.

Control of Axle and Articulation Actuators

The source of hydraulic fluid for the actuators is fluid reservoir 60, with the fluid being pressurized by a pump 62. Of course, steering of the vehicle 10 is ultimately controlled by the driver or operator through a steering wheel 64. In the embodiment of the invention seen in FIG. 1, the steering wheel 64 is operably connected to a mechanically operated steering control unit which includes a valve 66 for pressure control and for diverting the pressurized fluid into conduits 68 or 70, which are connected to the inlet ports of a diverting valve 72. In the embodiment illustrated in FIGS. 1 and 5, diverting valve 72 is a two-position six-way valve which allows fluid flow either to the axle actuator 46 or articulation actuators 42 and 44. The diverting valve 72 preferably is a spool valve which has a valve spool which is spring-loaded to a default position wherein the conduits 68 and 70 from the fluid source 73 (collectively comprising the reservoir 60, pump 62 and valve 66) are placed in communication with the conduits 76 and 74, respectively, leading to the articulation actuators 42 and 44. The diverting valve 72 is biased by suitable means (such as a spring 75) into the position shown in FIG. 5 so that if the valve control power is lost, the vehicle 10 will be placed in a position wherein articulation steering is possible, rather than no steering or steering simply via the wagon-wheel axle 22, as will be explained later.

The valve spool of diverting valve 72 is moved to overcome the bias of spring 75 by suitable means (such as a pilot line or solenoid). In FIG. 1, a pilot line system is shown wherein a pilot valve 78 is operatively connected to the valve spool of the diverting valve 72. Pilot valve 78 is provided with hydraulic fluid from a suitable reservoir 60 and which is pressurized by a pump 62. Operation of the pilot valve 78 is in turn manipulated by a solenoid controlled by a microprocessor controller 80.

To switch the diverting valve 72 from its default position to an axle-activated position, the pilot valve 78 is actuated on signal (in a manner to be described) to overcome the bias force of the spring 75. In this axle-activated position, the diverting valve 72 thus places the conduits 68 and 70 (from fluid source 73) in communication with the conduits 84 and 82, respectively, leading to the axle actuator 46 (and breaks the hydraulic flow connections between the articulation actuators 42 and 44 and the fluid source 73). The axle actuator 46 thus responds to the variations in fluid pressure as controlled by the valve 66, which in turn is controlled by the steering wheel 64. In effect, the variations in fluid pressure in the conduits 68 and 70 due to valve 66 provide signals to the diverting valve 72 dependent upon the desired direction of vehicle travel responsive to manipulation of the steering wheel 64 by the vehicle's operator.

For example, if turning to the right is desired (from the vehicle alignment position seen in FIG. 2A to those seen in FIGS. 2B and 2C), the vehicle operator manipulates the steering wheel 64, which in turn pressurizes the fluid in conduit 68. Because turning is sequential and starts with the pivoting of the wagon-wheel axle 22, the diverting valve 72 is initially placed in its axle-activated position by command of the controller 80. Pressurized fluid thus is transferred through conduit 84 into that chamber of axle actuator 46 which causes the piston rod portion 50 thereof to extend and pivot the wagon-wheel axle 22 relative to frame portion 12. As the wagon-wheel axle 22 is pivoted to the maximum extent allowable (alpha degrees), the controller 80 signals the pilot valve 78 to switch the diverting valve 72 to its default position wherein pressurized hydraulic fluid is then transferred through conduit 76 into those chambers of articulation actuators 42 and 44 which cause articulation actuator 42 to retract while simultaneously extending articulation actuator 44 (as seen in FIG. 2C). At the same time, the hydraulic flow connections between the axle actuator 46 and the fluid source are broken. Thus, further turning of the vehicle to the right is accomplished by articulating the frame portions 12 and 14 to a desired degree of articulation. To bring the vehicle back into position for generally linear travel (as seen in FIG. 2A), the sequence of diverting valve operation and fluid pressurization with respect to the actuators 42, 44 and 46 is reversed. Similarly, turning of the vehicle to the left is accomplished in a reverse manner from that described above.

Control of the diverting valve 72 is thus the key to effective steering of the vehicle 10 with the steering system of the present invention. As indicated, the diverting valve 72 is ultimately controlled by a microprocessor controller 80, which decides when to change the position of the diverting valve 72 based upon various dynamic and known parameters. Data on these dynamic factors are provided to the controller 80 from various sensors on the vehicle 10.

A variable impedance potentiometer 90 is operably mounted between the frame portion 12 and the wagon-wheel axle 22 to detect and provide an analog electrical signal providing information about the direction of wagon-wheel axle pivoting with respect to its frame portion (to the right or left from center), and the extent of such pivoting (i.e., zero to five degrees). From such a signal, the controller 80 is readily able to calculate the rate of such pivoting (i.e., the degree of pivot per second) in a convention manner. The electrical signal provided by potentiometer 90 are conveyed to the controller 80 via suitable conduit means 92.

A variable impedance potentiometer 94 is operably mounted between the vehicle frame portions 12 and 14 to detect the dynamic signals of articulation of the two frame portions. The potentiometer 94 detects and provides electrical signals based upon the direction of articulation of the frame portions (to the right or left from colinearly aligned), the extent of such articulation (i.e., zero to forty degrees) and the rate of such articulation (i.e., the degree of articulation per second). The electrical signals provided by potentiometer 94 are conveyed to the controller 80 via suitable conduit means 96. Those in the art will appreciate that any suitable position sensor providing equivalent positional information, such as a rotary optical encoders, may be used in place pots 90 and 94.

Figure 5:
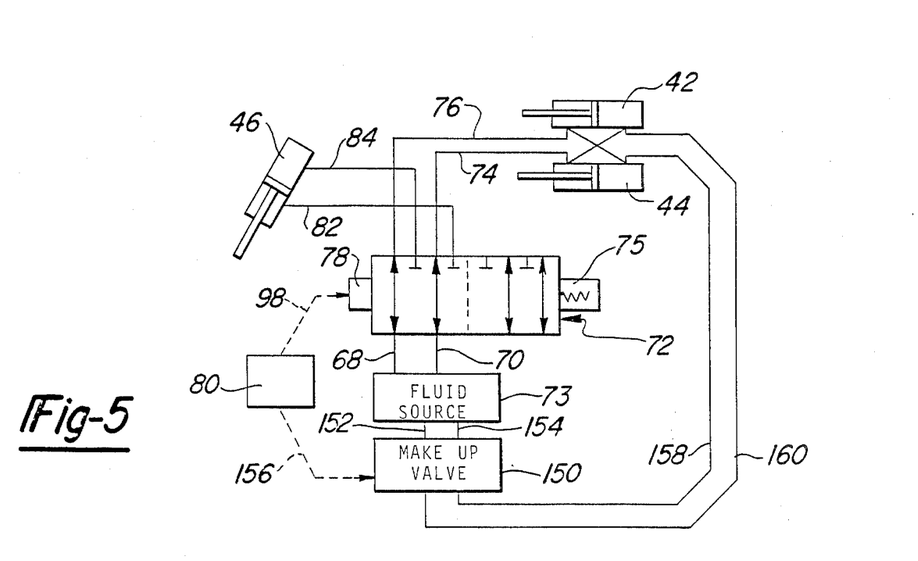
FIG. 5 is a schematic representation of the hydraulic diverting valve in the steering control system of the present invention.

Based upon the signals provided by the potentiometers 90 and 94 and other known steering parameters such as response time of the diverting valve 72, the controller 80 provides an electrical signal via suitable conduit 98 to manipulate the solenoid that activates pilot valve 78 and, in turn, the diverting valve 72 to switch back and forth from the wagon-wheel and articulation steering modes for the vehicle. By this means, the controller 80 thus ultimately controls the activation of the various hydraulic actuators 42, 44 and 46 for steering of the vehicle 10. Should the operator desire to steer solely in an articulation mode, a switch 100 is provided in the vehicle cab to override the valve switching operation of controller 80 and place the diverting valve 72 in its default position as seen in FIG. 5.

As illustrated in FIG. 1, the diverting valve 72, the controller 80 and the operable connection therebetween can be characterized in combination as a steering system control means 101 (see components outlined by dashed lines and labeled with reference character 101). This system control means 101 detects the variable parameter signals from three "sensors"—the valve 66 (via conduits 68 and 70), the potentiometer 90 (via conduit 92) and the potentiometer 94 (via conduit 96). In response to the signals it receives, the steering system control means 101 controls the operation of the axle and articulation actuators 42, 44 and 46.

Figure 6:
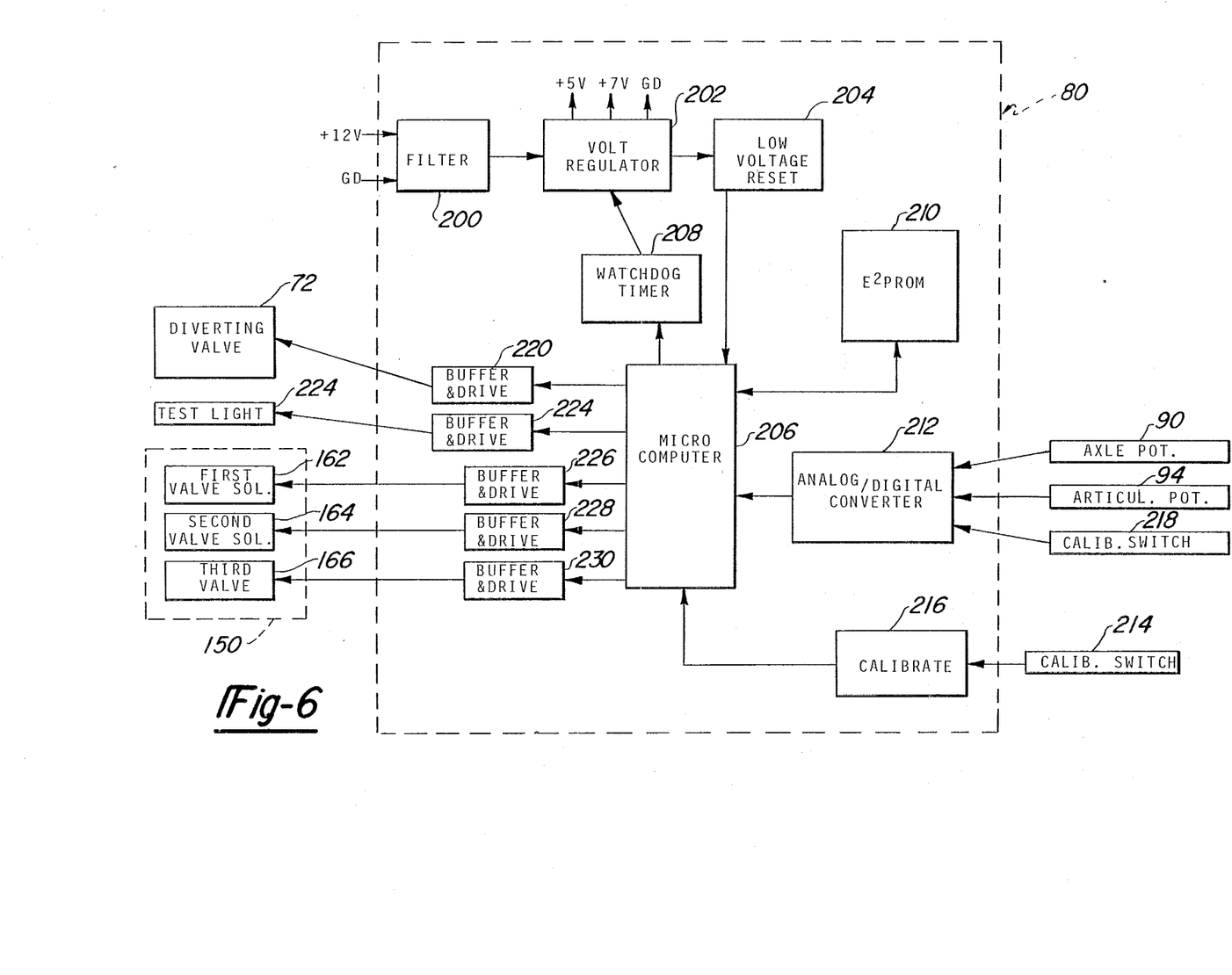
FIG. 6 is an electrical block diagram of one embodiment of the microprocessor controller for the improved steering system of the present invention.

FIG. 6 shows an electrical block diagram of one embodiment of microprocessor controller 80. The electronic controller 80 includes filter 200, voltage regulator 202, low voltage reset circuit 204, microcomputer 206, watchdog timer 208, E$^2$PROM memory 210, analog-to-digital (A/D) converter 212, calibration switch 214, calibrate circuit 216, calibration potentiometer 218, buffer and drive circuits 220 and 222, and test light 224. Electrical power to controller 80 is derived from the battery of tractor 10 through the ignition switch. Filter 200 is an input power filter circuit. The output of filter 200 is provided to voltage regulator circuit 202, which provides a regulated +5 V, +7 V, and ground potential GD used by the remainder of the circuitry of controller 80. In addition, the power from voltage regulator circuit 202 is used to energize steering potentiometer 90, articulation potentiometer 94, and calibration potentiometer 218.

Low voltage reset circuit 204 senses the output voltage of voltage regulator 202. If the voltage is too low for controller 80 to operate properly, low voltage reset circuit 204 provides a reset signal to microcomputer 206 which maintains controller 80 in an inactive, reset condition.

Microcomputer 206 controls the operation of controller 80 based upon inputs from A/D converter 212 and calibrate circuit 216, and upon stored calibration data from E$^2$PROM 210. Microcomputer 26 controls the operation of diverting valve 72 through buffer and drive circuit 220. In addition, microcomputer 206 controls the operation of test light 224 through buffer and drive circuit 222. Test light 224 is turned on and off by microcomputer 206 to provide visual indication to the operator during calibration procedures.

Watchdog timer 208 is an individually operating timer that operates on a different time base than microcomputer 206. In order to continue operation, microcomputer 206 must periodically reset watchdog timer 208. If watchdog timer 208 is not reset, and is allowed to time out, it provides a signal to filter circuit 200 which causes a shift in power resulting in the disabling of microcomputer 206.

A/D converter 212 converts analog signals from steering potentiometer 90, articulation potentiometer 94, and calibration potentiometer 218 to digital signals. The output of A/D converter 212 is serial digital data which is supplied to microcomputer 206.

When operation is initially started by the ignition being turned on, so that +12 V is supplied to filter circuit 200, microcomputer 206 first checks E$^2$PROM 210 to see whether the controller 80 has been calibrated. E$^2$PROM 210 stores a code which indicates whether calibration has previously taken place Because E$^2$PROM 210 is a nonvolatile memory, the calibration data and the code will remain intact even though the remainder of controller 80 has been turned off.

If the calibration sequence has been performed, the system goes into its normal control mode in which microcomputer 206 is continually scanning the steering and articulation potentiometer signals. As long as the steering signals being monitored by microcomputer 206 through A/D converter 212 are within the left and right-hand steering limits, valve 72 remains in its normal state, and articulation remains centered, assuming that there is no leakage of hydraulic fluid to, from or within cylinders 42 and 44.

When microcomputer 206 receives the steering signal which reaches the left or right-hand limit switch point, it de-energizes diverting valve 72 through buffer and drive circuit 220. This causes the articulation control to operate. As the operator of the tractor turns it back toward center and once again reaches the articulation center band, microcomputer 206 senses that articulation is back within the center band and switches back to the axle steering mode. Diverting valve 72 is, therefore, energized.

If calibration has not taken place, microcomputer 206 provides an indication to the operator through test light 224 indicating that calibration is necessary. The operator then presses a calibration start switch 218 which causes a voltage indicating its time to calibrate to be applied to A/D converter 212. Microcomputer 206 then checks the voltage of articulation potentiometer 94 and, if it is within a predetermined range, calibration of the articulation potentiometer 94 has been accomplished. The operator then depresses calibrate switch 214, which sends a signal to microcomputer 206 through calibrate circuit 216. This causes the system to move on the maximum steering left position. Microcomputer 206 monitors the signal from steering potentiometer 90 until it reaches a predetermined voltage range. It also waits for the operator to depress switch 214 again, which completes the calibration of the left steering position. Next, the procedure is repeated to identify the right steering position.

Each time the calibrate switch 214 is depressed, the value being read from articulation potentiometer 94 (in the case of the center position) and steering potentiometer 90 (in the case of the left and right-hand positions) are stored in E²PROM 210. The result, therefore, are three values representing the center of articulation, the left-hand maximum steering position, and the right-hand maximum steering position. When calibration has been completed and all three values stored, a code is also stored in E²PROM 210 indicating that calibration is complete. It is this code that microcomputer 206 checks each time controller 80 is powered up.

The left and right-hand switch points for going from the steering mode to the articulation mode are derived from the left and right maximum values stored in E²PROM 210. The switch points are preferably selected to be slightly toward center by a small amount from the left-hand and right-hand maximum values stored in E²PROM 210.

With the articulation band switch points, a set value is added and subtracted from the articulation center point stored in E²PROM 210 to define the center band within which articulation is centered, and the system should operate in the steering mode.

Steering System Compensation Factors

Because the mechanical components of the vehicle and hydraulic system will vary in tolerances, strengths, wear, etc., certain compensation or correction factors are required in order to continually return the articulation cylinders to the "home range" of one-half degree about the center line represented by zero in FIG. 4. For example, the diverting valve response time must be considered, as well as the condition of the hydraulic fluid (which will vary dependent upon temperature and pressure) and such factors as the biasing force of the spring 75 in the valve 72 (which may also vary dependent upon certain ambient conditions). Leakage of hydraulic fluid from the system is also a possibility that must be accounted for in designing an effective steering control system. In order to overcome all of these various potential mechanical variations in the system, correction factors are built into the steering control system of the present invention to ensure that the frame portions will always be ultimately placed within the home range when the vehicle is returned to alignment for generally linear travel.

Articulation Home Range Positioning

One correction factor employed by the steering system of the present invention accounts or corrects for "overshoot" and undershoot" of the home range by frame portion movement. For example, because the switching from axle steering to articulated steering to axle steering occurs in a dynamic environment, the diverting valve 72 may be switched from its default position to its axle-activated position too soon. Thus, the home range for articulation under this condition is not reached by the frame portions 12 and 14 (i.e. the articulation actuators 42 and 44 have "undershot" the home range). Alternatively, the diverting valve 72 may be actuated or react too late to place the frame portions 12 and 14 in the home range, and when the articulation actuators 42 and 46 are finally deactivated, the frame portions 12 and 14 will have "overshot" the home range. When the frame portions 12 and 14 are not placed in the home range position, correction is thus required and is initiated by means of the microprocess controller 80.

Potentiometer 94 continually provides the controller 80 with a signal dependent upon the degree of articulation of the frame portions 12 and 14. When this signal indicates that the frame portion 12 and 14 are outside of their homne range, and the diverting valve 72 is in its axle-activated position, the controller 80 reacts to place the frame portions 12 and 14 in the home range at an appropriate time. When the time is "appropriate" to reactivate the articulation actuators 42 and 44 is dependent upon the direction and rate of wagon-wheel axle pivoting, in addition to the relative articulation position of the frame portions 12 and 14. These factors are considered because if articulation for turning has been in a first direction (for example, from right to left) and the wagon-wheel axle 22 is pivoting in a second, opposite direction (from left to right), then correction to place the frame portions 12 and 14 within the home range may not be required because the vehicle operator is reversing the direction of turn of the vehicle 10. In this case, any error in reaching the articulation home range is cancelled out by turning the vehicle in the opposite direction (there is no need to reach the articulation home position if the turning direction is reversed).

Correction to place the frame portions 12 and 14 in the home range is only made when the wagon-wheel axle 22 is turning in the same direction as the direction of turn required to articulate to the home range. Thus, continuing with the above turning example, if the frame portions 12 and 14 have overshot the home range and are articulated outside of the home range to the left, correction will only be made by the controller 80 if the wagon-wheel axle 22 is turning to the right (because articulation to the right is necessary to reach the articulation home range). Correction is not necessary when there is continued turning of the vehicle 10 to the left, since such turning will result in pivoting of the wagon-wheel axle 22 to the left and ultimately the articulation of the frame portions 12 and 14 to the left.

The actual correction in the hydraulic system described above is accomplished by one or more pulsed signals from the controller 80 to the pilot valve 78. There signals cause the valve spool of the diverting valve 72 to rapidly pulse between its default position and its axle-activated position, thereby providing a pulsed activation of the articulation actuators 42 and 44 in the manner necessary to align the frame portions 12 and 14 in the home range. In achieving the articulation positional corrections described above, the rate of pivoting of the wagon-wheel axle 22 is considered by the controller 80 because valve response time must be considered and accounted for. If the rate of relative frame portion movement is too fast for a particular degree of articulation position error (extent of articulation outside of the home range), it is possible that an effort to achieve correction would cause the frame portions 12 and 14 to articulate to a position in error on the other side of the home range, rather than falling within the home range.

Figure 7:
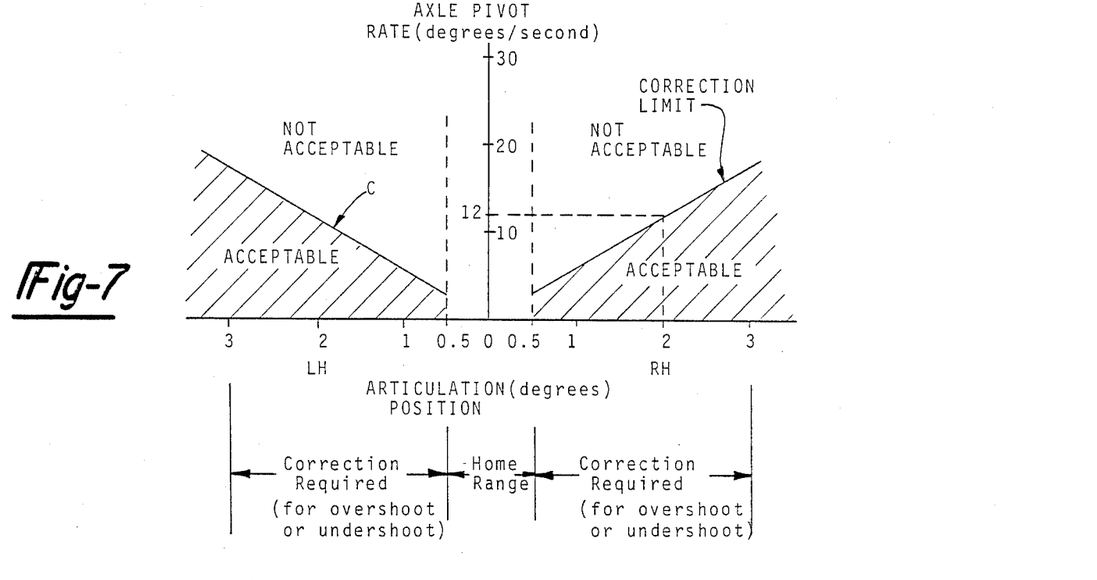
FIG. 7 is a graph illustrating the articulation error correction limit as a function of the degree of articulation (left or right) and the turn rate of the wagon-wheel axle.

FIG. 7 illustrates (for a typical two-position six-way spool valve, as more specifically described below) the "Acceptable" and "Not Acceptable" conditions for this correction factor in terms of wagon-wheel axle pivot rate and degree of articulation. In FIG. 7, the x-axis represents the articulation position (in degrees) of the two frame sections relative to one another, and the y-axis represents the wagon-wheel axle pivot rate (in degrees per second). The sloped line "c" on each side of the graph of FIG. 7 indicates the limit conditions at which correction will be made (or not made) depending upon a given degree of articulation and wagon-wheel axle pivot rate. For example, when (a) the frame portions are articulated two degrees to the right (and thus one and one-half degrees away from being within the range of articulation positions defining the home range, (b) the wagon-wheel axle pivot rate is from zero to approximately twelve degrees per second; and (c) the wagon-wheel axle is being pivoted to the left: the controller 80 will cause the diverting valve 72 to pulse pressurized hydraulic fluid to the articulation actuators 42 and 44 through conduit 76 (see FIGS. 1 and 5) to an extent sufficient to place the frame portions 12 and 14 within the home range. Of course, since the axle pivot rate and other dynamic parameters are constantly in a state of flux, further correction may be required.

Because the signals from the potentiometers 90 and 94 received by the controller 80 are electrical and generally instantaneous with respect to the parameter sensed thereby, this type of correction can be made almost as soon as an unacceptable state of articulation position is detected, within the limitations of the reaction times and other inaccuracies of the mechanical components of the hydraulic steering system. As a further explanation of the example above and referring again to FIG. 7, when the frame portions are articulated two degrees to the right and the wagon-wheel axle is pivoting to the right, no correction will be made. The home range for the vehicle is again turning to the right, since continued turning to the right will cause further articulation to the right away from the home range. In another situation, when the frame portions are articulated two degrees to the right and the rate of axle pivoting to the left is greater than approximately twelve degrees per second, no correction will be made. To attempt to make a correction (pulsed signals to the pilot valve 78 to switch the diverting valve 72) under the conditions would be likely to result in an overshoot of articulation to the left. For correction to be made when the frame portions are articulated two degrees in one direction, the axle pivot rate must be less than approximately twelve degrees per second to the other direction. A correction will only be made when the comparison of articulation position and axle pivot rate falls in the "Acceptable" range on or below the limit line "c" in FIG. 7.

An alternative and now presently preferred arrangement for making the actual correction in the hydraulic system described is accomplished by use of a makeup valve system. Such a make-up valve system for correction of overshoot/undershoot of the home range via articulated steering is illustrated in FIG. 5. A bleeder or spool valve system 150 is connected to the fluid source 73 by fluid conduits 152 and 154. Preferably, the makeup valve system 150 includes one or more spool valves having solenoids which control movement of the one or more spools for the left and right direction corrections. The solenoids are operably connected to the microprocessor controller 80 via suitable conduit 156.

The fluid pressure transmitted through the makeup valve system 150 from fluid source 73 is diverted to and from the articulation cylinders 42 and 44 via conduit means 158 and 160, as illustrated in FIG. 5. Thus, it is possible for the makeup valve system 150 to control actuation of the articulation cylinders 42 and 44 to a certain degree. Whether correction of the articulation position is necessary is determined as explained above. Once the controller 80 recognises that correction is advisable, it signals the makeup valve system 150 via conduit 156 to activate the solenoids to move a spool to permit the desired fluid flow. The makeup valve system 150 thus controls fluid flow from the fluid source 73 to and from the articulation cylinders 42 and 44 in the desired amount to activate those cylinders and bring the frame portions of the vehicle into the home range of articulation.

Figure 12:
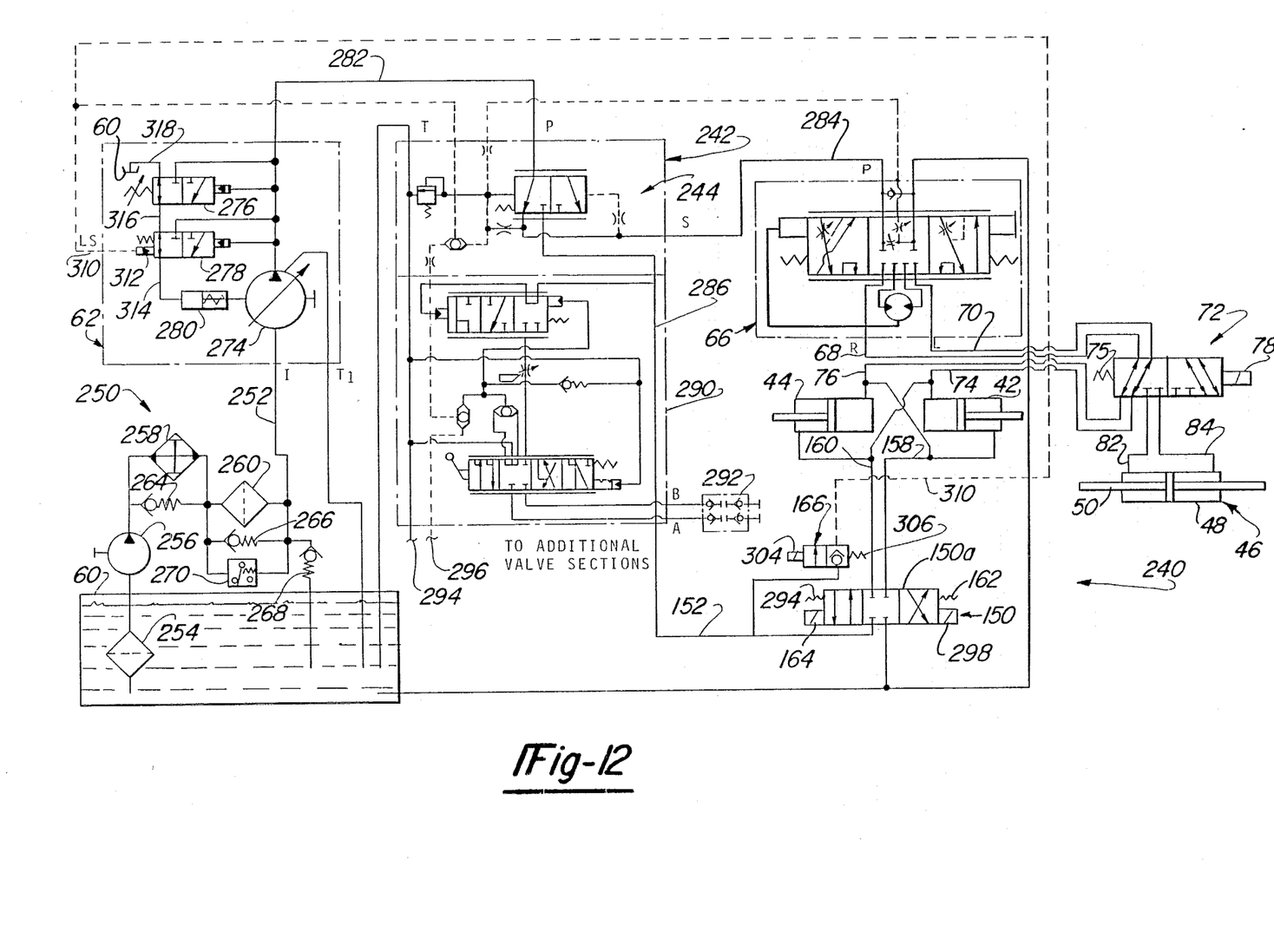
FIG. 12 is a detailed hydraulic diagram illustrating the preferred hydraulic circuit of the present invention which employs a solenoid-operated hydraulic make-up valve to return the articulated steering to its home position when the steering system is in its front-steer or pivotable wheel-steering mode.

In a preferred embodiment, the makeup valve system 150 includes a dual solenoid, three-position hydraulic directional control valve 150a, a first right-hand solenoid 162, second left-hand solenoid 164, and may include a third solenoid-operated valve 166 for load sensing in the hydraulic system. The valve 166 is used to ensure that the hydraulic pump of fluid source 73, which might possibly be in a low-pressure standby mode, is taken out of that mode and put into a higher pressure mode, as will be further explained in the discussion of FIG. 12. These valves and their solenoids are operably connected as shown in FIGS. 5 and 12 in a conventional arrangement and are in turn connected via buffer and drive circuits 226, 228 and 230, respectively, to the microcomputer 206 of the microprocessor controller 80 (see FIG. 6). Thus, the makeup valve system 150 is energized through buffer and drive systems 226, 228 and 230, as needed.

When the frame portions are in the home range, the controller 80 uses the makeup valve system 150 to keep those frame portions in that range. With this arrangement, there is no need to rapidly pulse the diverting valve 72 in order to make the necessary articulation position correction. Correction is accomplished by actuation of the makeup valve system 150.

FIG. 12 is a detailed schematic diagram which shows the presently preferred embodiment of the hydraulic system of the steering system of the present invention. The hydraulic system 240 includes the primary hydraulic pump unit 62, a conventional mechanically-operated steering control unit represented by valve block 66, the diverter valve 72, a conventional valve stack 242 with a conventional steering priority valve block 244, the articulation actuators 42 and 44, the wagon-wheel axle actuator 46, and the make-up valve system 150. The hydraulic system 240 also includes a closed hydraulic rservoir 60 and a conventional charging pump arrangement 250 for supplying the primary hydraulic pump unit 62 with ample, filtered hydraulic fluid on inlet line 252. The charge unit 250 includes a pre-charge pump strainer 254, a charge pump 256, an air-to-oil heat exchanger 258, fine mesh filter 260, spring-loaded bypass check valves 264 and 256 respectively located in parallel to heat exchanger 258 and filter 260, and a charge pump pressure relief valve 268. A spring-loaded pressure switch 270 may optionally be provided to indicate when the filter 260 is being bypassed. The primary pump unit 62 includes a variable-volume pump 274 and two pressure compensators 276 and 278 which regulate the flow of the variable volume pump through spring-loaded piston actuator 280. The charge unit 250 and primary hydraulic pump unit 62 are conventional in design and construction, and pumps 256 and 274 are connected to and driven by the power plant of the vehicle 10 in a conventional manner.

The pressurized hydraulic output fluid from primary pump unit 62 is delivered by conduit 282 to the valve stack 242 where the priority valve 244 distirbutes the flow to hydraulic conduit or line 284 any time the steering control valve 66 requires fluid, and otherwise distributes the fluid flow to pressure line or conduit 286 for use by other hydraulically-operated valves in the hydraulic system 240 such as the manually-selectable hydraulic valve section indicated by block 290. Valve section 290 may be used for example as the source of hydraulic fluid to quick disconnect couplings 292, to which external hydraulic-operated equipment, such as is found on many types of farming implements, may be connected. Additional manually-selected valve sections (not shown) may be provided if desired as indicated by broken connections 294 and 296 and noted at the bottom of valve stack 242.

The pressure line 286 from the valve stack 242 also supplies pressurized hydraulic fluid to conduit 152 leading to the make-up valve 150a. The make-up valve 150a is preferably a conventional electrically-operated, dual solenoid, three-position directional control valve which is returned to its closed-center position (when its solenoids are de-energized) by bias springs 294 and 296. When right-hand solenoid 162 of valve 150a is energized, the pressurized fluid from conduit 152 is directed to conduit 158, thus causing the rod of articulation cylinder 42 to retract and the rod of articulation cylinder 44 to extend, which articulates the vehicle 10 to the right. When left-hand solenoid 164 of make-up valve 150a is energized, the pressurized fluid from line 152 is directed to conduit 160, causing the rod of cylinder 42 to extend and the rod of cylinder 44 to retract, which articulates the vehicle 10 to the left. In this manner, the make-up valve 150a is able to perform the function of returning the articulation cylinders 42 and 44, and thus the frame portions 12 and 14, to their home position even while the steering system is in its wagon-wheel axle mode and the steering valve 66 is causing the wagon-wheel actuator 46 to retract or extend. In general, sufficient hydraulic fluid is available to the make-up valve 150a through conduit 152 to perform this function, since the front-steer system does not consume the entire hydraulic flow typically produced by primary hydraulic pump unit 62.

The load-sensing valve 166 is a solenoid-operated two-position valve. When the solenoid 304 of valve 166 is not energized, the valve 166 is returned to its normally closed position by its bias spring 306. When solenoid 304 is energized, valve 66 switches to its normally open position, thus allowing pressurized hydraulic fluid from conduit 152 to be applied to pilot line 310 which leads to a pilot-operator 312 of compensator valve 278. When the pilot line 310 is not pressurized, pump 274 is allowed to assume a low-pressure stand-by condition, since the hydraulic fluid in actuator 280 is able to flow to the reservoir 60 through conduits 314, 316 and 318. Load-sensing valve 166 pressurizes pilot line 310 whenever the make-up valve 150a is to be actuated so as to cause hydraulic fluid to be delivered to the articulation cylinders 42 and 44. In other words, the load-sensing valve 166 is actuated just prior to and during the time that either solenoid 162 or solenoid 164 of make-up valve 150a is to be energized. This ensures that sufficient pressurized fluid from primary pump unit 62 will be available to return the articulation cylinders 42 and 44 to their home position.

Further Steering Control Considerations During Turns Under Power

In certain circumstances involving turns made under power, the microprocessor controller 80 may possibly be misled if it is allowed to determine when the steering mode the steering system should be in the pivotal steering or axle steering mode solely from the positional information generated by potentiometer 90, which monitors the wagon-wheel axle position. In particular, during turns being made under power using articulation mode steering, it is possible for the wagon-wheel axle 22 to be rotated slightly on account of tractive or other forces upon front wheels 18. For example, in a turn of seven degrees on either side of the straight-ahead position, the wagon-wheel axle 22 may be rotated by such forces by two or more degrees, so that the potentiometer 90 indicates that the axle 22 is turned less than five degrees, which normally means that the steering system should be in the wagon-wheel axle steering mode rather than the articulated steering mode. If the steering system is then allowed to return to the wagon-wheel axle steering mode automatically, and the automatic return-to-home function performed by the make-up valve 150a is enabled, the articulation cylinders 42 and 44 will be automatically returned to the home articulation position for straight-ahead travel, even though such a steering maneuver is clearly not intended by the operator of the vehicle. To avoid such unintentional steering operation by the steering system, the microprocessor controller 80 is preferably programmed so that the steering system remains in the articulation mode any time the degree of articulation exceeds a predetermined absolute magnitude, such as 7.0 degrees. Also, the automatic return-to-home function performed with make-up valve 150a is disabled whenever the steering system is in the articulation mode.

Valve Response Considerations

Figure 8:
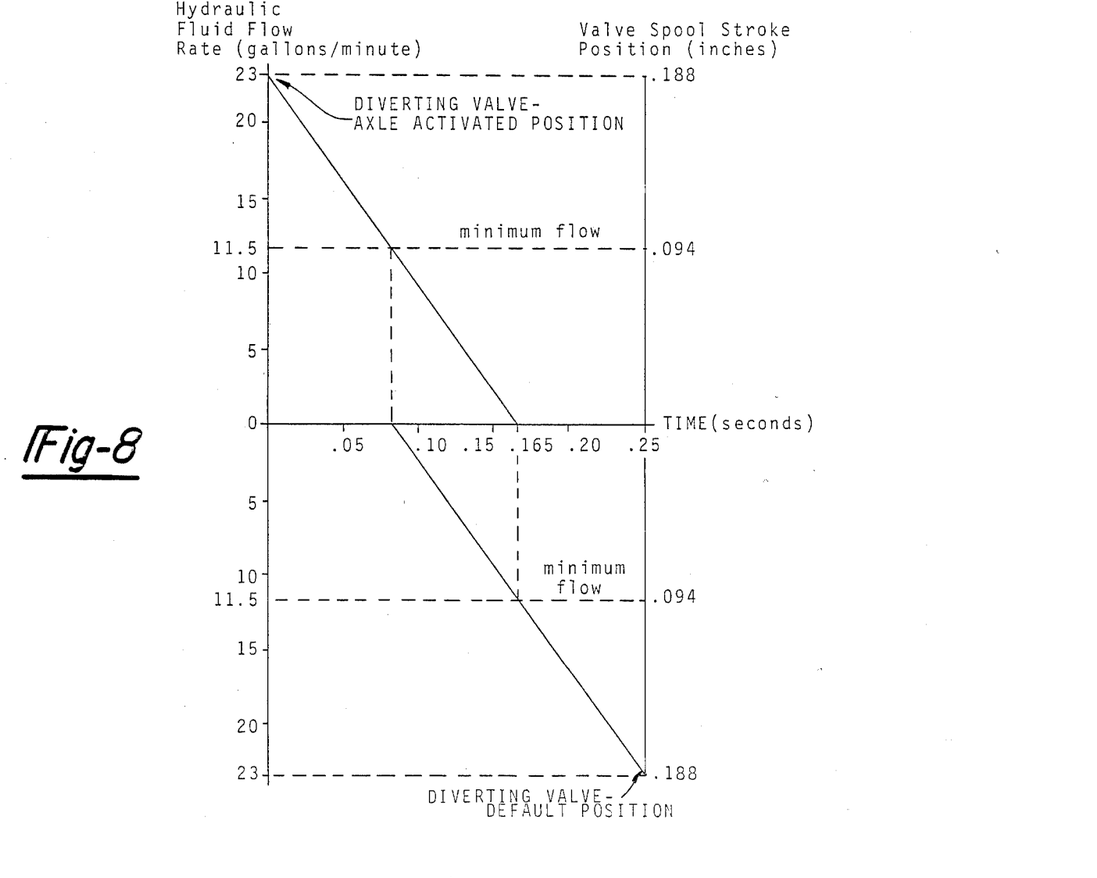
FIG. 8 is a graph illustrating valve flow and valve position as a function of time for a typical valve in the steering control system of the present invention.

When a two-position valve is used as the diverting valve 72, valve response time is an important factor to consider in attempting to achieve repeatability in the steering control system of the present invention. As the diverting valve is moved from one position to the other, the flow of pressurized hydraulic fluid is reduced to one set of actuators while proportionally increased to the other set. FIG. 8 illustrates the relative valve flow and position as a function of time for a typical two-position six-way spool valve. In FIG. 8, the central x-axis represents time (in seconds), the left-hand y-axis represents fluid flow through the valve (in gallons per minute) and the right-hand y-axis represents the physical position of the valve spool (in inches from a center position of zero).

For the valve whose operating characteristics are shown in FIG. 8, the valve spool moves through a 0.375 inch stroke, with a 0.090 inch overlap. In either of its two positions, the maximum flow rate through the valve is twenty-three gallons of hydraulic fluid per minute. The valve response time is 0.25 seconds to move through its 0.375 inch stroke and to change from its default position to its axle-activated position (or vice-versa). FIG. 8 illustrates the relative hydraulic fluid flow and valve position as a function of the time its takes to move the valve from its axle-activated position to its default position (the total time being 0.25 seconds). Obviously, in order to maintain repeatability of the hydraulic steering system and also to maintain its constant accuracy, this valve response time must be taken into account whenever such a diverting valve is activated to make a change between axle and articulated steering modes. In the time it takes such a diverting valve to react, the vehicle, in most cases, continues to turn. Thus, during the 0.25 seconds it takes the valve to switch positions, the position of the vehicle will change, and the rate of change of turning of the vehicle will probably change as well.

Figure 9:
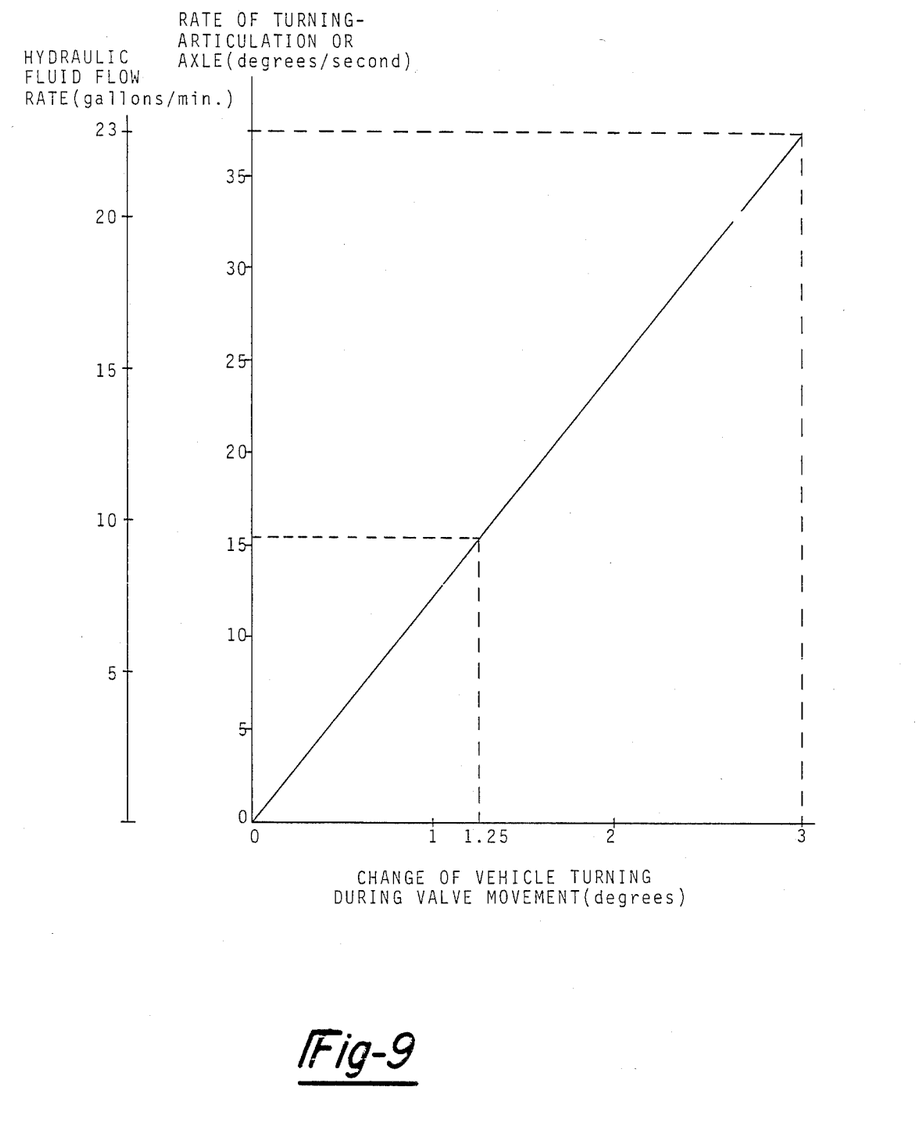
FIG. 9 is a graph illustrating the relationship between the axle pivot rate and the degree of vehicle turn valve movement for a typical valve in the steering control system of the present invention.

FIG. 9 illustrates (for the typical spool valve described above) the relationship between change (in degrees) of vehicle turning and the rate of axle or articulation pivoting. The dynamic parameters of both wagon-wheel axle and articulation are considered since at any point in time changes in either one may be determinative of changes in turning of the vehicle. For example, if the vehicle is in its axle steering mode and the rate of pivoting of the wagon-wheel axle 22 is approximately fifteen degrees per second, the vehicle 10 will turn approximately 1.25 degrees during the period required for the diverting valve 72 to move from its axle-activated position to its default position, or vice-versa. In order to maintain steering accuracy and repeatability, this inability of the physical components of the system to react instantaneously to decisions to change steering modes must be accounted for. To compensate for the time it takes the diverting valve 72 to react to a command to change its position, the controller 80 activates the diverting valve 72 earlier or later than it would in the perfect states illustrated by FIGS. 3 and 4. Thus, for example, if the vehicle 10 is being steered from a centered condition to the right at a rate of axle steering of fifteen degrees per second (as detected by the potentiometer 90), the controller 80 causes the diverting valve 72 to begin switching from its axle-activated position to its default position when the wagon-wheel axle 22 has pivoted 3.75 degrees relative to frame portion 12. Thus, by the time the wagon-wheel axle 22 has pivoted to its fullest extent of five degrees, the diverting valve 72 is completely switched to its default position and further vehicle steering is accomplished solely by articulation. FIG. 9 also illustrates the relative fluid flow rate through the diverting valve 72 of this example as opposed to the change of vehicle turning during valve movement.

As a further example, if the vehicle 10 is being steered from a right articulated position back to the left toward center at a rate of articulation of 15 degrees per second (as detected by potentiometer 94), the controller 80 causes the diverting valve 72 to begin switching from its default position to its axle-activated position when the frame portions 12 and 14 are articulated 1.75 degrees to the right (0.5 degrees as the outer limit of the home range plus 1.25 degrees as derived from the graph of FIG. 9). Thus, by the time the frame portions 12 and 14 have been articulated to a position of 0.5 degrees of articulation to the right (the edge of the home range of articulation), the diverting valve 72 is completely switched to its axle-activated position, and further vehicle steering to the left is accomplished solely by pivoting the wagon-wheel axle 22.

This relationship, for a given valve having given parameters of the spool valve in this example (FIGS. 8 and 9, and also FIG. 7), will be maintained throughout operation of the steering control system. The controller 80 activates the diverting valve 72 as necessary to compensate for valve response time, dependent upon the dynamic parameters (sensed by the axle and articulation potentiometers) of the axle and articulation steering rates, and the positions and directions of wagon-wheel axle pivoting and articulation. The controller 80 is programmed to activate the diverting valve 72 to switch from the axle steering mode to the articulation steering mode when the wagon-wheel axle is pivoted to its fullest extent of five degrees. Similarly, the controller 80 is programmed to activate the diverting valve 72 from the articulation steering mode to the axle steering mode when the frame portions 12 and 14 are placed within the home range of one-half degree from center. Knowing these desired diverting valve switching points, and also the various dynamic parameters sensed by the potentiometers, the controller ascertains the necessary response time of the diverting valve to make the switch from one steering mode to the other and controls the timing of the diverting valve 72 accordingly so that the physical components of the vehicle are in the desired positions for such switching: (1) the wagon-wheel axle 22 pivoted five degrees when switching from the axle steering mode to the articulation steering mode, or 92) the frame portions 12 and 14 within the home range when switching from the articulation steering mode to the axle steering mode.

Variable Position Valve

Figure 10:
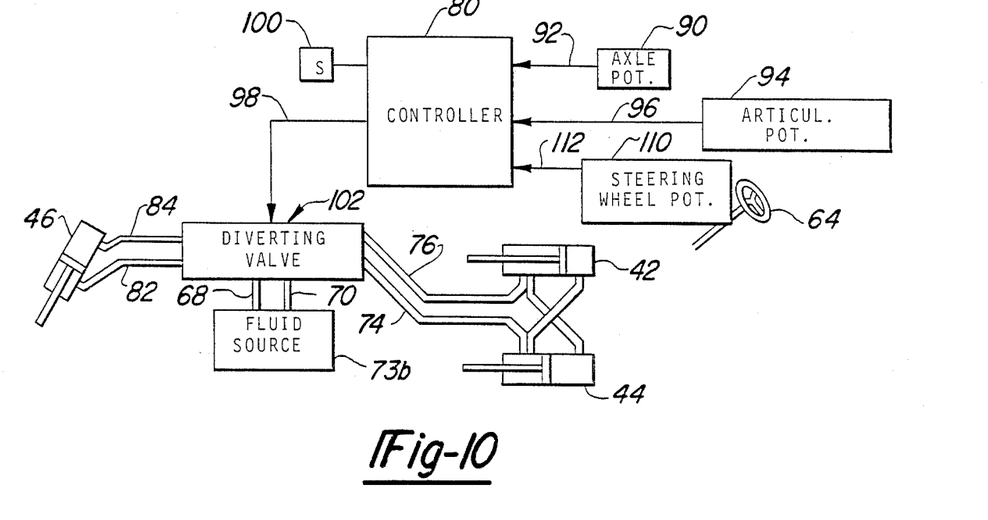
FIG. 10 is a schematic representation of another embodiment of the steering control system of the present invention.
Figure 11:
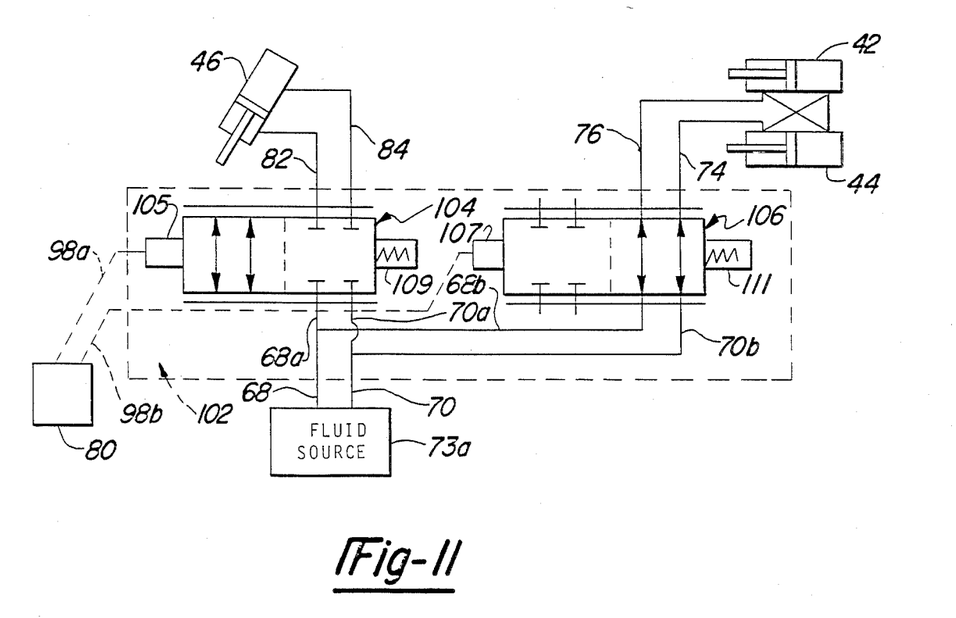
FIG. 11 is a schematic representation of another embodiment of the hydraulic diverting valve in the steering control system of the present invention.

A further embodiment of the present invention replaces the two-position six-way spool valve as the diverting valve 72 with a variable-position six-way flow control valve 102, as seen in FIGS. 10 and 11. The improved diverting valve 102 actually comprises a pair of the infinite-positioning four-way valves 104 and 106 (the two extreme positions for each valve are shown, with the infinite number of intermediate conditions being indicated by horizontal bars above and below the valve in accordance with the ANSI symbol code). Fluid supply conduits 68 and 70 from pressurized fluid source 73a split into conduits 68a and 70a which feed valve 104 and conduits 68b and 70b which feed valve 106. In this improved diverting valve 102, valve 104 controls only the flow of pressurized hydraulic fluid to and from the articulation actuators 42 and 44. Thus, the flow of fluid to the axle actuator 46 is independent from the flow of fluid to the articulation actuators 42 and 44 (and is independently controlled by the controller 80).

In this embodiment, valve response time is much less of a factor to consider with respect to switching back and forth from axle steering to articulated steering because the hydraulic actuators for the axle and articulation steering modes are now independently controlled. Each of the valves 104 and 106 has an infinite range of positions which the controller 80 can choose independently of the position of the other valve. The operation of each of the valves 104 and 106 (which are typically spool valves) is controlled in a manner similar to that described above for diverting valve 72, such as by means of either a pilot valve system or solenoid 105 and 107, respectfively, which receives electrical control signals from the controller 80. The valves 104 and 106 are biased by suitable means (such as springs 109 and 111, respectively) into the positions seen in FIG. 11 so that if the valve control power is lost, the vehicle 10 will be placed in position wherein articulation steering is possible, rather than no steering or steering simply via the wagon-wheel axle 22.

The electrical control signals are carried via conduit 98a from the controller 80 to valve 104 and via conduit 98b from the controller 80 to valve 106. The pressurized hydraulic fluid monitored by the valves 104 and 106 is provided in a similar manner as the system seen in FIG. 5. From the valve 104, pressurized hydraulic fluid flows (if allowed) via conduits 82 and 84 to the axle actuator 46. Similarly, from the valve 106, pressurized hydraulic fluid flows (if allowed) via conduits 74 and 76 to the articulation actuators 42 and 44 (see FIGS. 10 and 11).

The use of the improved diverting valve 102 with the steering system of the present invention thus allows the controller 80 to make the vehicle's transition from wagon-wheel axle steering to articulation steering less abrupt. The use of infinite position valves 104 and 106 permits the "feathering" or easing in and out of articulation steering, rather than simply turning articulation steering "on" and axle steering "off," or vice-versa. One type of infinite position which may be used is the conventional "pulse width modulated valve." The valves 104 and 106 are controlled by pulsed electrical signals (from the microprocessor controller 80). Thus, the valves 104 and 106 are not simply and abruptly opened or closed in combination. The length of the electrical pulses provided to the valves 104 and 106 from the controller 80 determines the time the valve is "open" to control the flow of pressurized fluid to the actuators, and also the extent to which the valve is opened.

In a further improved version of another embodiment of the present invention, the mechanical steering circuit unit which includes valve 66 is replaced by another variable impedance potentiometer which is mounted on the vehicle to detect the direction, rate and extent of turning of the steering wheel 64 (relative to that frame portion upon which the steering wheel is rotatably mounted). This third potentiometer is illustrated schematically in FIG. 10 as potentiometer 110. Electrical signals from the potentiometer 110 are conveyed via suitable conduit means 112 to the controller 80. Thus, electrical signals dependent upon the desired direction, rate and extent of turning of the vehicle are all detected (by monitoring the turning activities of the vehicle's steering wheel electrically) and analyzed electronically by the controller 80 to assist in controlling the hydraulic steering actuators, and the mechanically controlled steering control unit can be dispensed with.

In this embodiment, the valve 102 not only controls the direction of flow of the pressurized hydraulic fluid to the steering actuators, but also the pressure of the fluid which reaches the actuators. The valve 102 must thus be a load-sensing pulse width modulating valve that can control the pressurization of the pressurized fluid flow from the fluid source 73b (which typically includes a fluid reservoir and pump). In this embodiment, all dynamic parameters for vehicle steering are sensed electrically by the potentiometers 90, 94 and 110. Mechanical variations and inaccuracies are eliminated to the fullest extent possible to achieve a highly efficient, repeatable and powerful steering control system.

Although the present invention has been described with reference to the preferred embodiments, workers skilled in the art will recognize that changes may be made in form and detail without departing from the spirit and scope of the invention. For example, although the preferred embodiments described above employ a wagon-wheel axle to achieve pivotable wheel steering, those in the art should understand that other conventional pivotable wheel steering arrangements, such as Ackerman steering, may be used to provide the desired front-steer capabilities. Also, the wagon-wheel axle or Ackerman steering arrangement may be provided on the rear wheels instead of the front wheels of the vehicle, should that be desired or necessary in certain applications for the present invention. Accordingly, it is to be understood that the protection sought and to be afforded hereby should be deemed to extend to the subject defined by the appended claims, including all fair equivalents thereof.

We claim:

1. An improved steering system for an articulated vehicle of the type having first and second frame portions each provided with at least one pair of ground-engaging wheels, with the wheels associated with the first frame portion being mounted for pivotable wheel steering through pivoting movement of such wheels with respect to the first frame portion, first hydraulic actuator means for pivoting the wheels of the first frame portion with respect to the first frame portion, and second hydraulic actuator means for articulated steering by articulating the first and second frame portions relative to one another, the improvement comprising:

first means for determining the degree of pivot of at least one wheel of the first frame portion relative to the first frame portion;

second means for determining the degree of articulation of the first and second frame portions;

steering control means for selecting the direction of vehicle travel, including a manual steering member, at least first and second hydraulic fluid conduits, and hydraulic valve means for directing pressurized hydraulic fluid to the first conduit when movement of the manual steering member by a vehicle operator indicate the vehicle is to turn toward a first direction and to the second conduit when movement of the manual steering member by the vehicle operator indicates the vehicle is to turn in a second opposite direction; and system control means for controlling the first and second hydraulic actuators in response to said degree of pivot, said degree of articulation and the pressurized hydraulic fluid in the first and second conduits, including electrically operated hydraulic control valve means, in hydraulic fluid communication with the first and second conduits and the first and second hydraulic actuator means, for diverting the flow of pressurized hydraulic fluid in the first and second conduits sequentially between the first and second hydraulic actuators to effect steering of the vehicle by pivotable wheel steering and articulation steering.

2. The steering system of claim 1, wherein the system control means operates said electrically operated hydraulic control valve means so that sufficiently small operator-selected directional changes from straight-ahead vehicle travel are accomplished by said pressurized fluid being diverted by said electrically operated valve means solely to the first hydraulic actuator means, and so that larger operator-selected directional changes from a straight-ahead vehicle travel which require the wheels of the first frame portion to exceed a predetermined range of pivot with respect to the first frame portion are accomplished by said pressurized fluid being diverted by said electrically operated valve means initially to the first hydraulic actuator means until such predetermined range of pivot will be reached, and thereafter to the second hydraulic actuator means.

3. The steering system of claim 2, wherein the predetemined range of pivot for the wheels of the first frame portion for normal vehicle travel is no more than 5 degrees on either side of a home position of the wheels of the first frame portion, said home position being the position such wheels assume for straight-ahead vehicle travel with the longitudinal axes of the first and second frame portions being colinearly aligned.

4. The steering system of claim 2, wherein the system control means includes microprocessor means for controlling the automatic operation thereof, said microprocessor means including first means for monitoring the rate of change of said degree of articulation, and second means responsive to the rate of change of said degree of articulation for operating the hydraulic control valve means such that undershoot and overshoot of a home range positon of the first and second frame portions tends to be avoided when the steering control means automatically switches from articulated steering to pivotable wheel steering, said home range position being defined as a narrow range of articulation positions wherein the longitudinal axes of the first and second frame portions are generally colinearly aligned.

5. The steering system of claim 2, wherein the system control means includes microprocessor means for controlling the automatic operation thereof, said microprocessor means including first means for deciding when to switch between pivotable wheel steering and articulated steering, said first means including second means for preventing the steering control means from switching from articulated steering to pivotable wheel steering when the absolute magnitude of said degree of articulation exceeds a predetermined value.

6. The steering system of claim 1, further comprising:
third means for determining the rate of pivot of at least one wheel of the first frame portion with respect to the first portion,
fourth means for determining the rate of articulation of the first and second frame portions, and wherein
the system control means further includes electronic control means for controlling the timing of the operation of electrically operated valve means to divert pressurized fluid flow sequentially between the first and second hydraulic actuator means as a functions of said degree of pivot, said degree of articulation, said rate of pivot, and said rate of articulation.

7. The steering system of claim 1, wherein:
the first means includes a potentiometer, mounted at least in part to the first frame portion, which senses the degree of pivot of at least one wheel of the first frame portion relative to the first frame portion and provides a first signal corresponding to the sensed degree of pivot,
the second means includes a potentiometer, mounted between the first and second frame portions, which senses the degree of articulation of the first and second frame portions and provides a second signal corresponding to the sensed degree of articulation, and
the system control means includes microprocessor means for providing at least one command signal that actuates the electrically operated valve means, said microprocessor means receiving the first and second signals and producing the command signal at least in part in response to the first and second signals.

8. An improved steering control system for an articulated vehicle of the type having an articulation steering mode wherein first and second frame portion of the vehicle are articulated by first hydraulic actuator means to steer the vehicle, and a pivotable wheel steering mode wherein at least one pair of wheels mounted on the first frame portion is pivoted relative thereto by second hydraulic actuator means to steer the vehicle, the improvement comprising:
steering control means for enabling a vehicle operator to select the direction of vehicle travel, including a manual steering member; first hydraulic valve means for switching from one steering mode to the other steering mode and vice versa by selectively direction pressurized hydraulic fluid to the first and second hydraulic actuator means; and
electrically operated make-up valve means, distinct from the first hydraulic valve means, for controlling hydraulic fluid flow between a fluid source and the first hydraulic actuator means to bring the first and second frame portions to a predetermined articulation position when a correction of the articulation position of the first and second frame portions is desired while the steering control system is operating in the pivotable wheel steering mode.

9. The steering system of claim 8, wherein the predetermined articulation position is a home articulation position where the longitudinal axes of the first and second frame portions are substantially colinearly aligned.

10. The steering system of claim 8, wherein the electrically operated make-up valve means includes at least a pair of solenoids associated with at least one hydraulic control valve, with the electrical energization of the first such solenoid causing movement of the first hydraulic actuator means in a first direction and the electrical energization of the second such solenoid causing movement of the first hydraulic actuator means in a second opposite direction.

11. The steering system of claim 8, wherein:
the steering control means includes a first and second hydraulic fluid conduits, and the first hydraulic valve means includes first control valve means for directing pressurized hydraulic fluid flow to the first conduit when movement of the manual steering member by the vehicle operator, indicates the vehicle is to be turned toward a first direction, and to the second conduit when movement of the manual steering member indicator the vehicle is to be turned in a second opposite direction, and second control valve means for switching from one steering mode to the other steering mode and vice versa by selectively diverting the flow of pressurized fluid from the first and second conduits ot one or the other of the first and second hydraulic actuator means.

12. The steering system of claim 11, wherein the second hydraulic control valve means is electrically operated, and the steering system further comprises:
first sensor means for determining the degree of articulation between the first and second frame positions; and
system control for controlling the operation of the second hydraulic control valve means and the make-up valve means, including microprocessor means for monitoring the mode of operation of the steering system and the degree of articulation of the first and second frame positions in order to determine whether the articulation position needs correcting and when to such correction should be performed.

* * * * *